US009612015B2

(12) United States Patent
Brun et al.

(10) Patent No.: US 9,612,015 B2
(45) Date of Patent: Apr. 4, 2017

(54) OXY-COMBUSTOR OPERABLE WITH SUPERCRITICAL FLUID

(71) Applicant: Southwest Research Institute, San Antonio, TX (US)

(72) Inventors: Klaus Brun, Helotes, TX (US); Aaron M. McClung, San Antonio, TX (US); Rebecca A. Owston, Hondo, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 481 days.

(21) Appl. No.: 14/319,583

(22) Filed: Jun. 30, 2014

(65) Prior Publication Data

US 2015/0377484 A1 Dec. 31, 2015

(51) Int. Cl.
| | | |
|---|---|---|
| F23L 7/00 | (2006.01) | |
| F23C 5/06 | (2006.01) | |
| F23C 9/00 | (2006.01) | |
| F23D 1/00 | (2006.01) | |
| F23C 9/08 | (2006.01) | |

(52) U.S. Cl.
CPC ............... *F23L 7/007* (2013.01); *F23C 5/06* (2013.01); *F23C 9/003* (2013.01); *F23C 9/08* (2013.01); *F23D 1/005* (2013.01); *Y02E 20/344* (2013.01)

(58) Field of Classification Search
None
See application file for complete search history.

(56) References Cited

U.S. PATENT DOCUMENTS

| 6,520,767 B1* | 2/2003 | Ahern | F02M 25/0228 239/427 |
|---|---|---|---|
| 2003/0050520 A1* | 3/2003 | Ahern | F23D 11/24 585/241 |
| 2010/0300063 A1* | 12/2010 | Palmer | F23D 1/00 60/39.461 |
| 2011/0083435 A1* | 4/2011 | Palmer | F23D 1/00 60/650 |
| 2014/0080073 A1* | 3/2014 | Zanganeh | F23L 15/00 431/11 |

FOREIGN PATENT DOCUMENTS

| DE | 3238737 A1 | 4/1984 |
|---|---|---|
| DE | 19500962 A1 | 8/1985 |
| DE | 4102610 A1 | 7/1992 |
| JP | 58043313 A | 3/1983 |
| JP | S62033214 A | 2/1987 |
| JP | S62087710 A | 4/1987 |
| JP | 2001208337 A | 8/2001 |

* cited by examiner

*Primary Examiner* — David J Laux
(74) *Attorney, Agent, or Firm* — Grossman, Tucker et al.

(57) ABSTRACT

An oxy-combustor is provided which comprises a combustion vessel including at least one solid fuel slurry inlet port, at least one oxygen inlet port and at least one supercritical fluid inlet port, wherein the combustion vessel is operable at an operating pressure of at least 1,100 psi; an interior of the combustion vessel comprises a combustion chamber and a supercritical fluid infusion chamber surrounding at least a part of the combustion chamber, the supercritical fluid infusion chamber and the combustion chamber are separated by a porous liner surrounding the combustion chamber, and the supercritical infusion chamber is located between the porous liner and an outer casing of the combustion vessel.

21 Claims, 5 Drawing Sheets
(2 of 5 Drawing Sheet(s) Filed in Color)

OXY-COMBUSTOR OPERABLE WITH SUPERCRITICAL FLUID

STATEMENT OF GOVERNMENT SPONSOR

This invention was made with government support under contract no. DE-FE0009395 awarded by the United States Department of Energy. The government has certain rights in the invention.

FIELD

The present disclosure relates to relates generally to coal-fired electricity generating power plants. More particularly, the disclosure relates to an oxy-combustor wherein a solid fuel (coal) slurry is processed in a presence of a super-critical fluid (carbon dioxide) environment.

BACKGROUND

Oxy-combustion is an energy conversion technique utilized in certain industries requiring high combustor firing temperatures, such as metal smelting, glass making and hazardous waste disposal.

In order to achieve higher combustor firing temperatures, the fuel is burned in a presence of an oxygen-rich stream rather than using conventional air, which is only about 21% oxygen by volume. The oxygen-rich stream fed into the combustor is produced by processing conventional air through an air separation unit, which removes the nitrogen from the air, which is about 78% of the volume.

Oxy-combustion yields flue gas which is predominately formed of carbon dioxide, as compared to conventional air-fired combustion wherein the flue gas is predominately formed of nitrogen. As a result of the reduction in nitrogen in the flue gas, the production of nitrogen oxides ($NO_x$) as a result of the combustion process are greatly reduced. In addition, the carbon dioxide may be captured and sequestered.

Combustion of fuel in an environment with nearly pure oxygen also results in a substantial rise in the combustor firing temperature to about 3,500° C., often which cannot be sustained by the combustor which may be ordinarily designed to operate at about 2,000° C. As a result, recirculation of the flue gas in oxy-combustion may be used to reduce the combustor firing temperature to a lower level. Thus, as may be understood, the oxy-combustion process may enable adjustment of the combustor firing temperature by varying the carbon dioxide recycle rate to control the volume of diluent gas to achieve higher or lower temperatures.

As such, several key attributes of oxy-combustion, particularly the elimination of nitrous-oxides and high concentration of carbon dioxide in the flue gas, are prompting interest in oxy-combustion for power generation with integrated carbon capture. These characteristics are advantageous for meeting emissions requirements and potential greenhouse gas mandates by minimizing the economic impact of carbon capture. However, these advantages are currently balanced by the cost and auxiliary power requirements required to provide near pure oxygen to the combustor using current air separation techniques.

Unfortunately, before captured gaseous carbon dioxide can be sequestered, it must be compressed. In order to provide a more efficient system, the present disclosure makes use of supercritical carbon dioxide oxy-combustion. Furthermore, coupling supercritical oxy-combustion with a supercritical carbon dioxide power generation block as disclosed herein offers several technical advantages that could reduce the cost of electricity, such as compact equipment which could minimize capital costs and high thermal efficiencies which reduce fuel requirements and operating costs. Supercritical oxy-combustion enhances this by offering high combustion efficiencies, compact combustors, and a high quality flue gas at near pipeline pressures suitable for carbon sequestration, enhanced oil recovery, or as a source of carbon dioxide for commercial utilization.

SUMMARY

The present disclosure provides an oxy-combustor comprising a combustion vessel including at least one solid fuel slurry inlet port, at least one oxygen inlet port and at least one supercritical fluid inlet port. The combustion vessel is operable at an operating pressure of at least 1,100 psi. The interior of the combustion vessel comprises a combustion chamber and a supercritical fluid infusion chamber at least partially surrounding the combustion chamber. The supercritical fluid infusion chamber and the combustion chamber are separated by a porous liner surrounding the combustion chamber, and the supercritical fluid infusion chamber is located between the porous liner and an outer casing of the combustion vessel.

In certain embodiment, the supercritical fluid infusion chamber may be in fluid communication with at least one supercritical fluid inlet port containing a supercritical fluid, and the supercritical fluid inlet port may receive the supercritical fluid from a supercritical fluid recirculation loop which recycles the supercritical fluid from flue gas.

In certain embodiments, the porous liner may comprise a plurality openings arranged to introduce the supercritical fluid from the supercritical fluid infusion chamber to the combustion chamber; with plurality of openings have a size in a range of 0.001 to 0.25 inches.

In certain embodiment, the at least one solid fuel slurry inlet port may be arranged at an upper end of the combustion vessel such that a solid fuel slurry introduced into the combustion chamber from the at least one solid fuel slurry inlet port flows downward under gravity along a longitudinal length of the combustion chamber towards a lower end of the combustion vessel.

In certain embodiments, the oxy-combustor further may comprise a mixing apparatus having a dispensing head, with the dispensing head being movable towards the at least one solid fuel slurry inlet port to close the at least one solid fuel slurry inlet port, and being movable away from the at least one solid fuel slurry inlet port to open the at least one solid fuel slurry inlet port.

In certain embodiments, the dispensing head may be connected to a shaft located in the at least one solid fuel slurry inlet port, and the shaft may be extendable out of the at least one solid fuel slurry inlet port to move the dispensing head away from the at least one solid fuel slurry inlet port to open the at least one solid fuel slurry inlet port, and the shaft may be retractable into the at least one solid fuel slurry inlet port to move the dispensing head towards the at least one solid fuel slurry inlet port to close the at least one solid fuel slurry inlet port.

In certain embodiments, the oxy-combustor may further comprise a mixing apparatus having a dispensing head, with the dispensing head being connected to a shaft located in the at least one solid fuel slurry inlet port, and the dispensing head being located adjacent a distal end of the at least one solid fuel slurry inlet port.

In certain embodiments, the dispensing head may comprise a solid fuel slurry trajectory surface formed at a trajectory angle relative to a longitudinal axis of the combustion vessel, and the trajectory angle may be from 20 degrees to 70 degrees. In certain embodiments, the trajectory angle may be from 30 degrees to 60 degrees. In certain embodiments, the dispensing head may comprise a rotating disk.

In certain embodiments, the mixing apparatus may be arranged to introduce the solid fuel slurry into the combustion chamber at a trajectory angle relative to a longitudinal axis of the combustion vessel, the at least one oxygen inlet port may be arranged to introduce oxygen into the combustion chamber at a trajectory angle relative to the longitudinal axis of the combustion vessel, and the trajectory angle of the oxygen from the at least one oxygen inlet port and the trajectory angle of the solid fuel slurry from the mixing apparatus may be within 10 degrees of one another.

In certain embodiments, the dispensing head may be arranged to introduce the solid fuel slurry into the combustion chamber at a trajectory angle relative to a longitudinal axis of the combustion vessel, the at least one oxygen inlet port may be arranged to introduce oxygen into the combustion chamber at a trajectory angle relative to the longitudinal axis of the combustion vessel, and the trajectory angle of the oxygen from the at least one oxygen inlet port and the trajectory angle of the solid fuel slurry from the dispensing head may intersect within the combustion chamber.

The present disclosure also provides a method of operating an oxy-combustor, which may comprise providing an oxy-combustor comprising a combustion vessel including at least one solid fuel slurry inlet port, at least one oxygen inlet port and at least one supercritical fluid inlet port. The combustion vessel is operable at an operating pressure of at least 1,100 psi. The interior of the combustion vessel comprises a combustion chamber and a supercritical fluid infusion chamber at least partially surrounding the combustion chamber. The supercritical fluid infusion chamber and the combustion chamber are separated by a porous liner surrounding the combustion chamber, and the supercritical infusion chamber is located between the porous liner and an outer casing of the combustion vessel. The method further comprises introducing a supercritical fluid into the supercritical fluid infusion chamber from the at least one supercritical fluid inlet port, introducing the supercritical fluid from the supercritical fluid infusion chamber to the combustion chamber by passing the supercritical fluid through the porous liner and creating a supercritical fluid environment in the combustion chamber, introducing a solid fuel slurry into the combustion chamber from the at least one solid fuel slurry inlet port, introducing oxygen into the combustion chamber from the at least one oxygen inlet port; and burning the solid fuel in the combustion chamber such that heat generated from the burning of the solid fuel heats the supercritical fluid.

In certain embodiments, the method may further comprise mixing the solid fuel slurry with a mixing apparatus having a dispensing head, with the dispensing head being connected to a shaft located in the at least one solid fuel slurry inlet port, and the dispensing head being located adjacent a distal end of the at least one solid fuel slurry inlet port.

In certain embodiments, mixing the solid fuel slurry with a mixing apparatus having a dispensing head may include applying the solid fuel slurry to a solid fuel slurry trajectory surface of the dispensing head, rotating the dispensing head while the solid fuel slurry flows downward under gravity along the trajectory surface and forming droplets of the solid fuel slurry as the solid fuel slurry separates from a perimeter edge of the dispensing head.

In certain embodiments, the at least one solid fuel slurry inlet port may be arranged at an upper end of the combustion vessel such that a solid fuel slurry introduced into the combustion chamber from the at least one solid fuel slurry inlet port flows downward under gravity along a longitudinal length of the combustion chamber towards a lower end of the combustion vessel.

In certain embodiments, the method may further comprise directing the solid fuel slurry into the combustion chamber at a trajectory angle relative to a longitudinal axis of the combustion vessel; directing the oxygen into the combustion chamber at a trajectory angle relative to the longitudinal axis of the combustion vessel; and wherein the trajectory angle of the oxygen and the trajectory angle of the solid fuel slurry are within 10 degrees of one another.

In certain embodiments, the method may further comprise directing the solid fuel slurry into the combustion chamber at a trajectory angle relative to a longitudinal axis of the combustion vessel; directing the oxygen into the combustion chamber at a trajectory angle relative to the longitudinal axis of the combustion vessel; and wherein the trajectory angle of the oxygen and the trajectory angle of the solid fuel slurry intersect within the combustion chamber.

FIGURES

The patent or application file contains at least one drawing executed in color. Copies of this patent or patent application publication with color drawing(s) will be provided by the Office upon request and payment of the necessary fee.

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
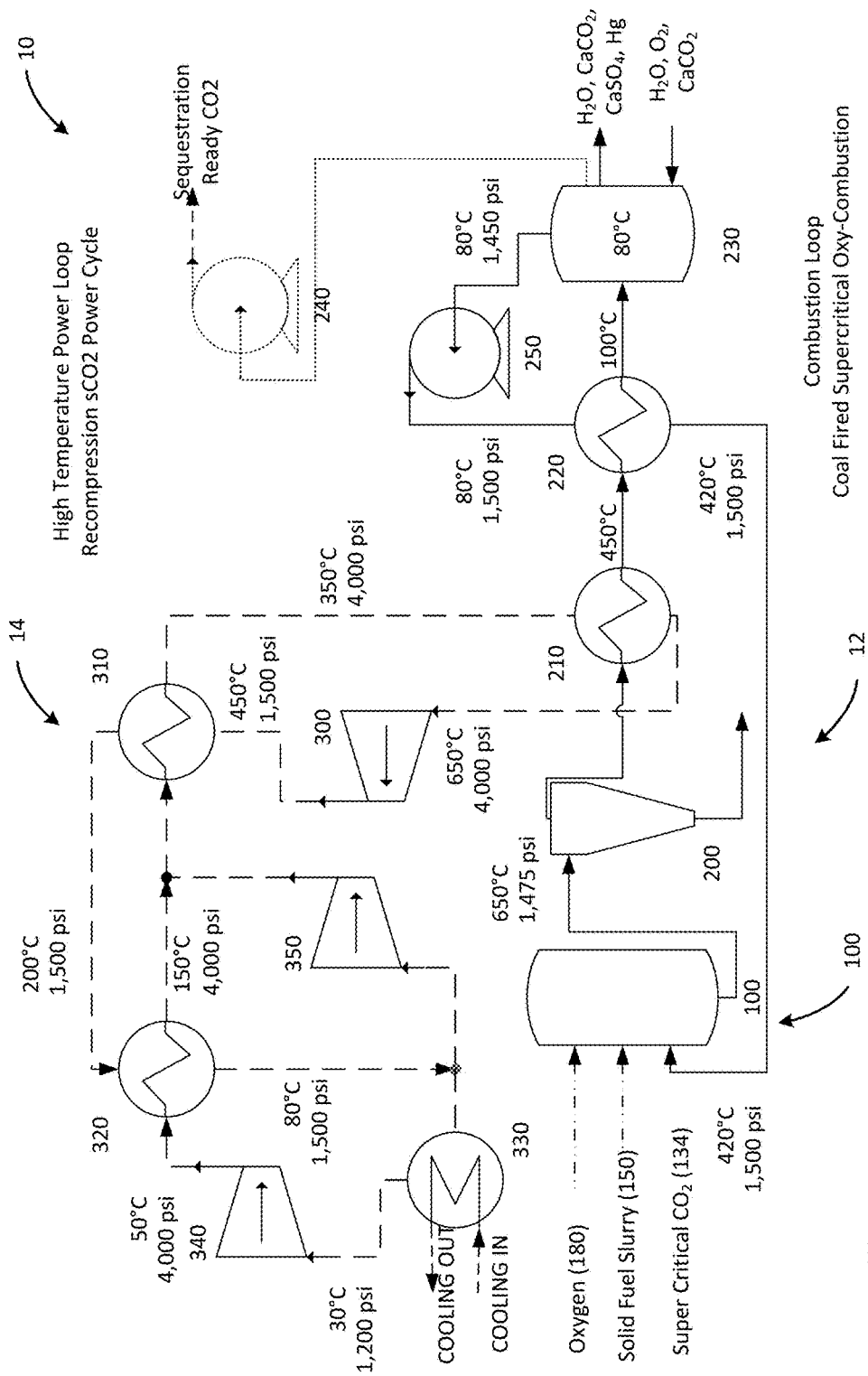
FIG. 1 is an exemplary indirect supercritical oxy-combustion cycle layout with a recompression supercritical carbon dioxide power generation block.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to FIG. 1 there is shown a process flow/layout diagram of an electric power generation arrangement 10 for an exemplary coal-fired electricity generating power plant. More particularly, FIG. 1 illustrates an indirect supercritical carbon dioxide ($sCO_2$) oxy-combustion cycle with a recompression supercritical carbon dioxide ($sCO_2$) power generation block/cycle.

As used herein, supercritical carbon dioxide ($S-CO_2$) may be defined as a fluid state of carbon dioxide held at or above its critical temperature (31.1° C.) and critical pressure (72.9 atm or 7.38 MPa). Carbon dioxide may often be more generally observed in gaseous form (in air) at standard temperature and pressure (STP). Alternatively, if the temperature and pressure of carbon dioxide are both increased from STP to be at or above the critical point for carbon dioxide, i.e. at or above its critical temperature and critical pressure, carbon dioxide exhibits properties between a gas and a liquid.

As shown, power generation arrangement 10 comprises a combustion loop 12, provided by coal-fired supercritical carbon dioxide ($sCO_2$) oxy-combustion. Power generation arrangement 10 further comprises a high temperature power generation loop 14, which is provided by a recompression supercritical carbon dioxide ($sCO_2$) power generation block/cycle.

A supercritical carbon dioxide ($sCO_2$) oxy-combustion cycle with a dual loop configuration, as shown in FIG. 1, is advantageous over a direct fired configuration due to the decoupling of the combustor pressure from the turbine inlet pressure. The indirect configuration allows the combustor 100 to operate near 1,500 psi (about 100 atm), or just above the critical point of the carbon dioxide (in order to take advantage of reduced cost of compression for the captured carbon dioxide stream, while allowing the power generation block to operate with a turbine inlet pressure of 4,000 psi (about 270 atm), a favorable operating pressure significantly greater than the combustion loop.

As shown, the indirect supercritical carbon dioxide ($sCO_2$) oxy-combustion loop 12 coupled with a closed system recompression Brayton cycle power generation block 14 makes extensive use of heat exchangers and recuperators. This extensive use of heat exchangers emphasizes the need for low cost, compact heat exchangers in order to take advantage of the compact supercritical carbon dioxide ($sCO_2$) turbo-machinery and ensure a minimal increase in the cost of electricity. FIG. 1 sets forth temperatures and pressures of the carbon dioxide at the various stages of each loop. For the purposes of the present disclosure, the temperatures and pressures shown in FIG. 1 are considered to be exemplary average temperatures and pressures.

As shown, indirect supercritical carbon dioxide ($sCO_2$) oxy-combustion loop 12 makes use of an oxy-combustor 100. As shown, combustor 100 is provided with inputs comprising streams of supercritical carbon dioxide ($sCO_2$) 134, a solid fuel slurry 150 and oxygen 180. Additional details concerning the configuration and operation of the combustor 100, as well as the specific location of the inputs (i.e. supercritical carbon dioxide ($sCO_2$) 134, solid fuel slurry 150 and oxygen 180) to the combustor 100 may be found further herein.

As shown, recycled supercritical carbon dioxide ($sCO_2$) 134 from flue gas is provided to combustor 100 at a temperature of about 420° C. and a pressure of about 1,500 psi, which creates a supercritical carbon dioxide ($sCO_2$) environment within combustor 100.

Upon combustion of the solid fuel slurry 150 and oxygen 180 within combustor 100, additional carbon dioxide is produced and the combustion heats the supercritical carbon dioxide ($sCO_2$), while the pressure decreases slightly. Upon leaving the combustor 100, the supercritical carbon dioxide ($sCO_2$), which is now at a temperature of about 650° C. and a pressure of about 1,475 psi and includes combustion contaminates, enters a cyclone separator 200. The cyclone separator 200 then separates out particulate (e.g. ash, dirt) from the supercritical carbon dioxide ($sCO_2$).

After leaving the cyclone separator 200, the contaminated supercritical carbon dioxide ($sCO_2$) is passed through a first heat exchanger 210, where the contaminated supercritical carbon dioxide ($sCO_2$) transfers thermal energy to the working fluid, also supercritical carbon dioxide ($sCO_2$), of the high temperature power generation loop 14. In doing so, the temperature of the supercritical carbon dioxide ($sCO_2$) of the combustion loop 12 drops to about 450° C.

Thereafter, the contaminated supercritical carbon dioxide ($sCO_2$) is passed through a second heat exchanger 220, where the contaminated supercritical carbon dioxide ($sCO_2$) transfers thermal energy to the recycled (cleaned) supercritical carbon dioxide ($sCO_2$) being sent to combustor 100. In doing so, the temperature of the contaminated supercritical carbon dioxide ($sCO_2$) drops to about 100° C.

Thereafter, the contaminated supercritical carbon dioxide ($sCO_2$) is introduced to a decontamination (flue gas clean up) station 230 which cleans the supercritical carbon dioxide ($sCO_2$) to pipeline quality. In doing so, the temperature of the cleaned supercritical carbon dioxide ($sCO_2$) drops to about 80° C., and the pressure drops to about 1,450 psi. Upon being cleaned, a portion of the cleaned supercritical carbon dioxide ($sCO_2$) may be sent to a sequestration pipeline after being passed through an isothermal compressor 240. The remaining cleaned supercritical carbon dioxide ($sCO_2$) may be recycled by first passing the cleaned supercritical carbon dioxide ($sCO_2$) through an isothermal compressor 250 to increase the pressure of the recycled (cleaned) supercritical carbon dioxide ($sCO_2$) to about 1,500 psi.

After passing through isothermal compressor 250, the cleaned supercritical carbon dioxide ($sCO_2$) is then passed through heat exchanger 220 where it is heated by the contaminated supercritical carbon dioxide ($sCO_2$) to a temperature of about 420° C. and recirculated back to the combustor 100 to repeat the process.

Turning to the power generation loop 14, as set forth above, the supercritical carbon dioxide ($sCO_2$) of the combustion loop 12 transfers thermal energy to the working fluid, also supercritical carbon dioxide ($sCO_2$), of the power generation loop 14. In doing so, the temperature of the supercritical carbon dioxide ($sCO_2$) of the combustion loop drops to about 450° C., while the supercritical carbon dioxide ($sCO_2$) working fluid of the power generation loop 14 increases in temperature from about 350° C. at 4,000 psi to about 650° C. at 4,000 psi.

The supercritical carbon dioxide ($sCO_2$) working fluid is then passed through an expander (turbine) 300 where the temperature and pressure of the supercritical carbon dioxide ($sCO_2$) working fluid decreases to about 450° C. and 1,500 psi, respectively.

After the expander (turbine) 300, the supercritical carbon dioxide ($sCO_2$) working fluid is then passed through a first heat exchanger 310 where the supercritical carbon dioxide ($sCO_2$) working fluid transfers thermal energy to another portion of the working fluid traveling to heat exchanger 210.

In doing so, the temperature of the supercritical carbon dioxide (sCO$_2$) of the power generation loop 14 drops to about 200° C. while maintaining pressure at about 1,500 psi.

Thereafter, the supercritical carbon dioxide (sCO$_2$) working fluid is then passed through a second heat exchanger 320 where the supercritical carbon dioxide (sCO$_2$) working fluid transfers thermal energy to another portion of the working fluid traveling to heat exchanger 210. In doing so, the temperature of the supercritical carbon dioxide (sCO$_2$) of the power generation loop 14 drops to about 80° C. while maintaining pressure at about 1,500 psi.

The supercritical carbon dioxide (sCO$_2$) working fluid is then passed through a cooler 330 where the temperature and pressure of the supercritical carbon dioxide (sCO$_2$) working fluid decreases to about 30° C. and about 1,200 psi, respectively.

The supercritical carbon dioxide (sCO$_2$) working fluid is then passed through a compressor 340 where the temperature and pressure of the supercritical carbon dioxide (sCO$_2$) working fluid increases to about 50° C. and about 4,000 psi, respectively.

Thereafter, the supercritical carbon dioxide (sCO$_2$) working fluid is then passed through the heat exchanger 320 where it is heated to 150° C. at 4,000 psi, and then passed through heat exchanger 310 where it is heated to 350° C. at 4,000 psi. After passing through heat exchanger 210, the supercritical carbon dioxide (sCO$_2$) working fluid is again further heated to a temperature of about 650° C. at 4,000 psi, and the cycle is then repeated.

Figure 2:
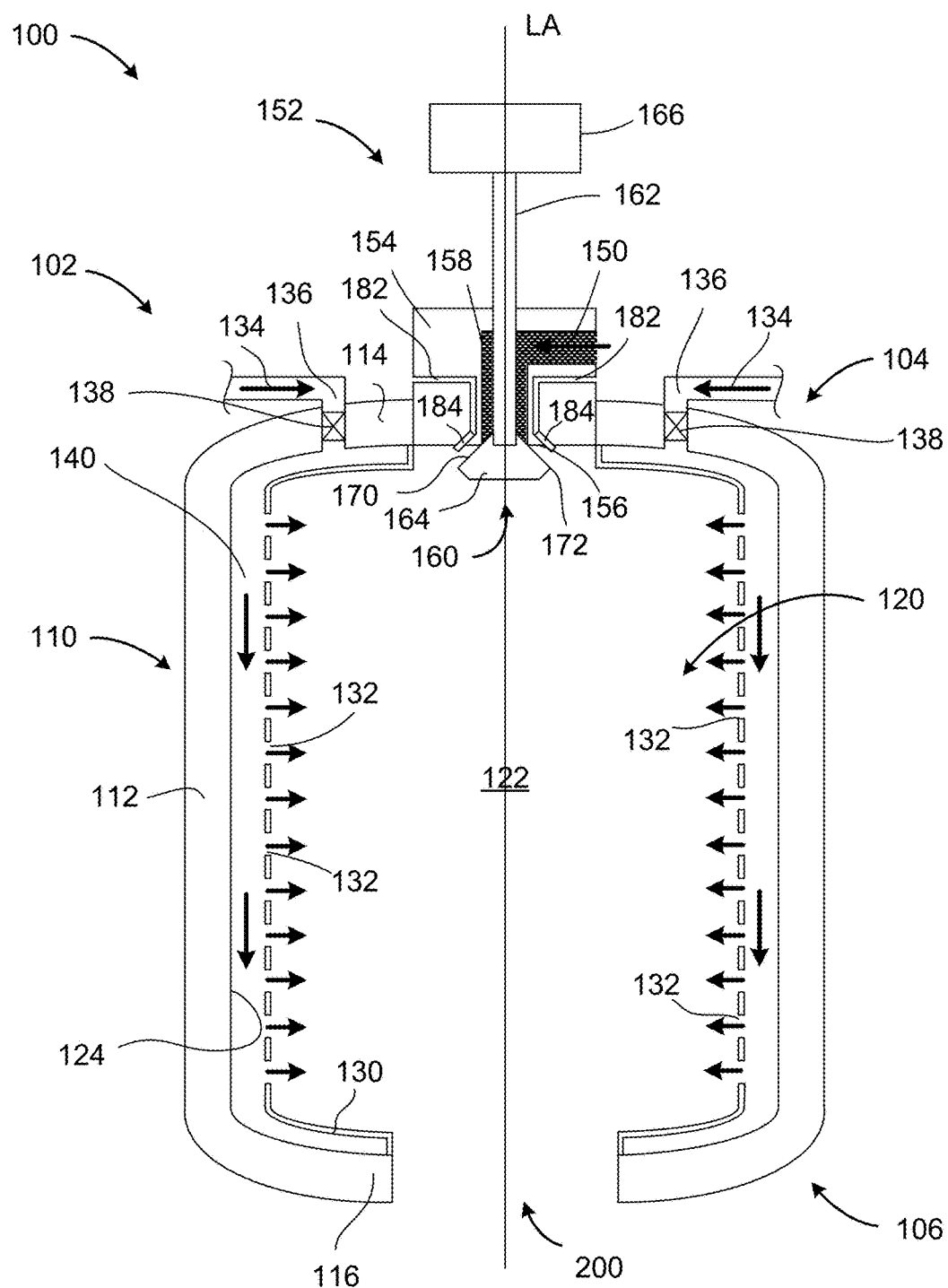
FIG. 2 is an exemplary cross-sectional side view of an oxy-combustor according to the present disclosure prior to introduction of a solid fuel slurry and oxygen therein.

Referring now to FIG. 2, the supercritical carbon dioxide (sCO$_2$) oxy-combustion loop 12 makes use of a supercritical carbon dioxide (sCO$_2$) oxy-combustor 100 which converts the solid fuel slurry 150 into thermal energy. As may be understood with supercritical carbon dioxide (sCO$_2$) oxy-combustor 100, fuel is burned in a presence of an oxygen-rich stream (e.g. 95% or greater) rather than using conventional air, which results in a higher combustor firing temperature, with a maximum to about 3,500° C. To reduce and control the combustor firing temperature within combustor 100, a portion of the carbon dioxide flue gas produced as a result of fuel combustion is recirculated back through the combustion chamber 122 of the combustor 100. More particularly, the combustor 100 is particularly configured and arranged to receive and operate with recirculated flue gas in the form of supercritical carbon dioxide (sCO$_2$) to provide a supercritical carbon dioxide (sCO$_2$) environment within the combustor 100.

As such, the supercritical carbon dioxide (sCO$_2$) combustor 100 is particularly configured and arranged to operate at pressures and temperatures above the critical point of carbon dioxide, i.e. 31.1° C. and 72.9 atm. As set forth above supercritical carbon dioxide (sCO$_2$) may be understood to exhibit properties of both its liquid and gaseous states. Supercritical carbon dioxide (sCO$_2$) exhibits high density, low viscosity, and is mildly compressible.

Combustor 100 comprises a cylindrical combustion vessel 102. Combustion vessel 102 has a first (upper) end 104 and an opposing second (lower) end 106. Combustion vessel 102 further comprises an outer (structural) cylindrical casing 110 having a sidewall 112 extending between opposing upper end wall 114 and lower end wall 116. The interior of the casing 110 defines an interior cavity 120 which provides a combustion chamber 122.

Combustion vessel 102 further comprises a porous thermal inner liner 130 which preferably extends over and follows the contour of the inner surface 124 of sidewall 112, as well as upper end wall 114 and lower end wall 116. More particularly, as shown, an annular infusion chamber 140 is formed between the outer cylindrical casing 110 and the porous thermal liner 130. The width of the infusion chamber (i.e. the distance from the inner surface 124 of the sidewall to the porous thermal liner 130) is preferably sized to allow cooling for the outer pressure vessel. The infusion chamber at least partially or fully surrounds the combustion chamber 122.

As shown porous thermal liner 130 includes a plurality of fluid infusion inlet openings 132 which, as explained in greater detail below, infuse the combustion chamber 122 with supercritical carbon dioxide (sCO$_2$) from the surrounding infusion chamber 140.

As such, infusion chamber 140 may be understood as a supercritical carbon dioxide (sCO$_2$) infusion chamber 140 which surrounds at least in part or completely the combustion chamber 122, with the supercritical carbon dioxide (sCO$_2$) infusion chamber 140 and the combustion chamber 122 being preferably separated by the porous liner 130 surrounding the combustion chamber 122. The infusion chamber delivers sCO$_2$ and operates to insulate the combustion chamber 122 as disclosed more fully herein. Accordingly, the supercritical carbon dioxide (sCO$_2$) infusion chamber 140 is preferably located between the porous liner 130 and the outer casing 110 of the combustion vessel 102.

More particularly, a supercritical carbon dioxide (sCO$_2$) stream 134 may be injected or otherwise introduced into infusion chamber 140 through at least one supercritical carbon dioxide (sCO$_2$) inlet port 136 which is in fluid communication with the infusion chamber 140. As shown, supercritical carbon dioxide (sCO$_2$) inlet port 136 comprises a cylindrical passage extending through the upper end wall 114 of casing 110 of combustion vessel 102. As shown in FIG. 2, supercritical carbon dioxide (sCO$_2$) inlet port 136 receives supercritical carbon dioxide (sCO$_2$) 134 from a supercritical carbon dioxide (sCO$_2$) which recycles the supercritical carbon dioxide (sCO$_2$) 134 from flue gas.

Supercritical carbon dioxide (sCO$_2$) inlet port 136 may be opened and closed by at least one pressure valve 138. In addition to creating a supercritical carbon dioxide (sCO$_2$) environment in combustion chamber 122, the introduction of the supercritical carbon dioxide (sCO$_2$) into the volume provided by infusion chamber 140 enables for control of a temperature of the casing 110 to a temperature between the temperature of the recirculated supercritical carbon dioxide (sCO$_2$) stream 134 and the combustor firing temperature.

In the foregoing manner, the casing 110 is thermally insulated from the combustor firing temperature by the supercritical carbon dioxide (sCO$_2$) stream 134, and the casing 110 may be constructed of materials which ordinarily would not be suitable for exposure to the temperatures occurring in an oxy-combustor. Such materials may include 304 or 316 Stainless for temperatures below 640° C. For example, while the combustor firing temperature may be in a range of 625-675° C., the temperature of the supercritical carbon dioxide (sCO$_2$) stream 134 may in a range of 375-425° C., thus maintaining the temperature of the casing 110 at such lower temperature. As such, in order to better control the temperature of the casing 110, the temperature of the casing 110 may be moderated to a temperature of 375° C. to 425° C. by the continuous circulation of supercritical carbon dioxide (sCO$_2$) through the porous thermal liner 130.

Combustor 100 is particularly configured and arranged to process a solid fuel slurry 150 in a presence of the supercritical carbon dioxide (sCO$_2$) environment within combustion chamber 122. More particularly, the solid fuel slurry 150 may comprise coal. Even more particularly, the coal slurry may comprise pulverized coal (having a particle size in a range of 10 microns to 100 microns) mixed with water (liquid) or carbon dioxide (gas) as a carrier fluid. In the case of a water carrier, the solid fuel slurry may comprise at least 50% coal by weight, and more particularly at least 60% coal by weight. In the case of a gaseous carbon dioxide carrier, the solid fuel slurry may comprise at least 20% coal by weight. Particularly with water as the carrier, the pulverized coal slurry 50 may have a varying viscosity depending upon the mass fraction at the time of entering combustor 100.

As shown in FIG. 2, solid fuel slurry 150 may be introduced to the combustion chamber 122 of the combustor 100 through a mixing apparatus 152 located at the first (upper) end 104 of the combustion vessel 102. As shown, mixing apparatus 152 includes a mounting block 154 to mount the mixing apparatus 152 to the casing 110 of the combustion vessel 102. More particularly, mixing apparatus 152 includes a solid fuel slurry inlet port 158 comprising a cylindrical passage formed in the mounting block 154 through which the solid fuel slurry 150 is injected or otherwise introduced to combustion chamber 122.

As shown, a distal end opening 156 of the solid fuel slurry inlet port 158 may be opened and closed by a dispensing head 160 located at a distal end of an extendable and retractable shaft 162 which extends longitudinally through the inlet flow port 158 and the longitudinal axis LA of the combustion vessel 102. As such, the dispensing head 160 is movable towards the at least one solid fuel slurry inlet port 158 to close the at least one solid fuel slurry inlet port 158, and movable away from the at least one solid fuel slurry inlet port 158 to open the at least one solid fuel slurry inlet port 158.

As shown in FIG. 2, the shaft 162 is in its retracted position with the dispensing head 160 sealed against the mounting block 154 and adjacent the distal end opening 156 of the solid fuel slurry inlet port 158, thus closing the distal end opening 156 of the solid fuel slurry inlet port 158.

Figure 3:
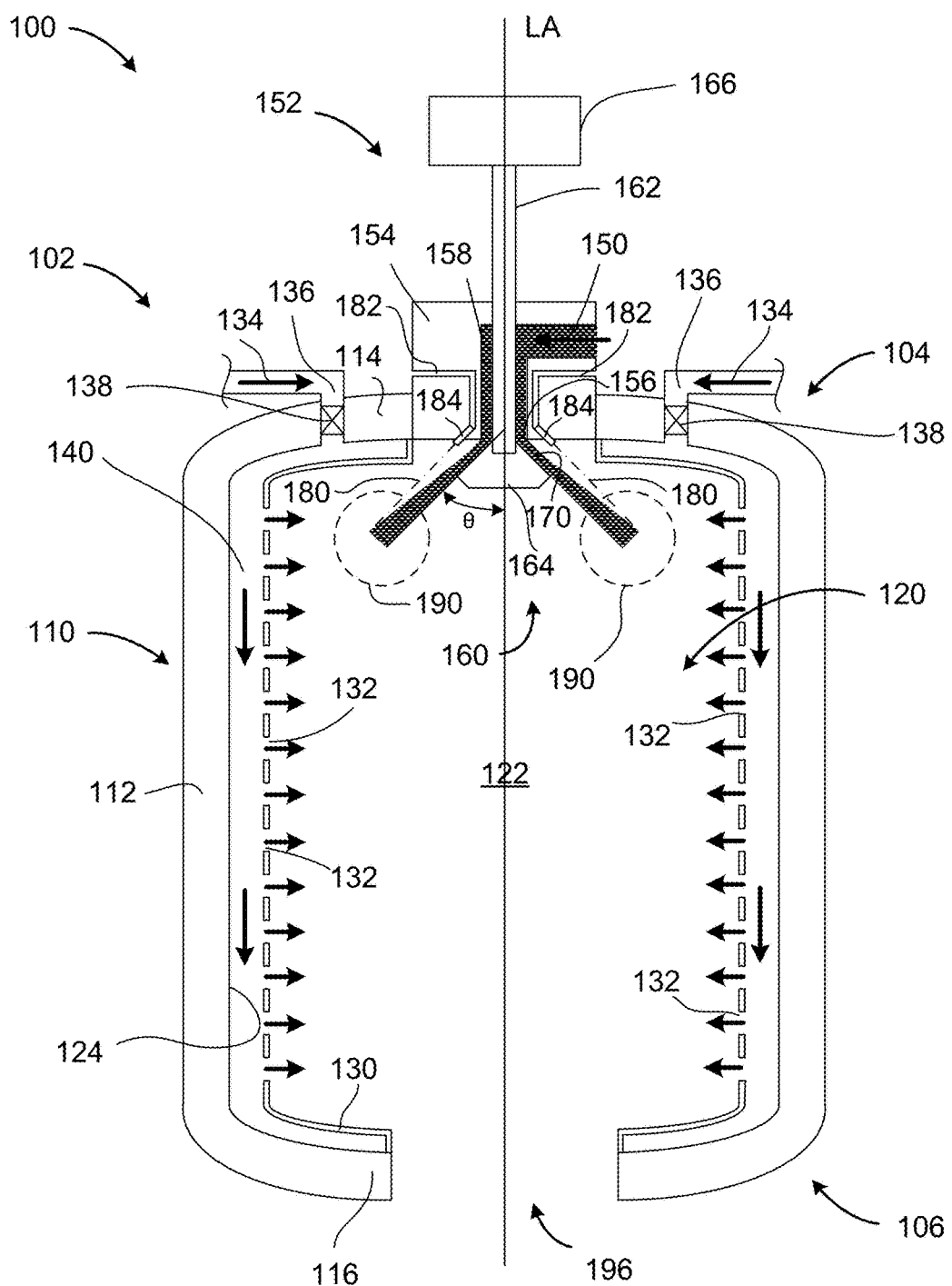
FIG. 3 is an exemplary cross-sectional side view of the oxy-combustor of FIG. 2 after introduction of a solid fuel slurry and oxygen therein.

Referring now to FIG. 3, the shaft 162 is in its extended position with the dispensing head 160 displaced from the mounting block 154, thus opening the distal end opening 156 of the solid fuel slurry inlet port 158. As a result, the solid fuel slurry 150 may now flow from the solid fuel slurry inlet port 158 and into the combustion chamber 122.

Thus, the shaft 162 is extendable out of the at least one solid fuel slurry inlet port 158 to move the dispensing head 160 away from the at least one solid fuel slurry inlet port 158. In certain embodiments, such extension of the shaft 162 may be performed to open the at least one solid fuel slurry inlet port 158. Alternatively, the shaft 162 may additionally be retractable into the at least one solid fuel slurry inlet port 158 to move the dispensing head 160 towards the at least one solid fuel slurry inlet port 158. In certain embodiments, the retraction of the shaft 162 may be performed to close the at least one solid fuel slurry inlet port 158.

In other embodiments, the movement of the shaft 162 may be performed to change a location of introduction of the solid fuel slurry 150 relative to the longitudinal axis LA of the combustion vessel 102, and more particularly the combustion chamber 122 in order to change a location of the combustion zone 190 discussed in greater detail below. Movement of the shaft 162 may be performed before or during introduction of the solid fuel slurry 150 in order to change the burn characteristics of the solid fuel slurry 150 within the combustion chamber 122.

In order to better distribute the solid fuel slurry 150 in the combustion chamber 122, the dispensing head 160 is provided in the form of a rotating (spinning) disk 164 which is rotated via shaft 162 being coupled to electric motor 166.

Rotating disk 164 includes an annular (conical) upper trajectory surface 170, which may be a planer surface, formed at a trajectory angle $\theta$ in a range of 20 degrees and 70 degrees relative to the longitudinal axis LA of the combustion vessel 102 (which is also the longitudinal axis of shaft 162 and the solid fuel slurry inlet port 158). More particularly, upper trajectory surface 170 may be formed at a trajectory angle $\theta$ in a range of 30 degrees and 60 degrees relative to the longitudinal axis LA of the combustion vessel 102. Thus, the mixing apparatus 152, and more particularly the dispensing head 160, is arranged to introduce the solid fuel slurry 150 into the combustion chamber 122 at a trajectory angle $\theta$ relative to a longitudinal axis LA of the combustion vessel 122.

In addition to at least one solid fuel slurry inlet port 158 located at the upper end 104 of the combustion vessel 102, the mounting block 154 of the mixing apparatus 152 further includes at least one oxygen inlet port 182 comprising a cylindrical passage through which substantially pure oxygen (95% or greater by weight) 180 may be injected or otherwise introduced into the combustion chamber 122. As shown, the at least one oxygen inlet port 182 is adjacent the at least one solid fuel slurry inlet port 158 (within 15 mm) and the oxygen 180 may be injected from injectors 184 at a trajectory angle $\theta$ in a range of 20 degrees and 70 degrees relative to the longitudinal axis LA of the combustion vessel 102. More particularly, the oxygen may be injected into the combustion chamber 122 from injectors 184 at a trajectory angle $\theta$ in a range of 30 degrees and 60 degrees relative to the longitudinal axis LA of the combustion vessel 102.

As shown, the trajectory angle $\theta$ for both the oxygen 180 and the solid fuel slurry 150 are injected at substantially the same trajectory angle, within 10 degrees of one another, such that the trajectory of the solid fuel slurry 150 from the mixing apparatus 152, particularly dispensing head 160, and trajectory of the oxygen 180 from the oxygen inlet port 182 intersect within the combustion chamber 122.

Upon the oxygen 180 and solid fuel slurry 150 being introduced to combustion chamber 122, the solid fuel slurry 150 flows downward along annular (conical) upper trajectory surface 170 as the disk 164 is rotated. As the solid fuel slurry 150 flows along surface 170 and reaches the perimeter circular edge 172 of the disk 164, the rotation of the disk 164 distributes the solid fuel slurry as small droplets into the combustion chamber 112 with the droplets having a diameter in a range of 20 microns to 200 microns. By rotation of the disk 164, the disk 164 operates as an atomizer and utilizes centripetal acceleration and shear forces to thereby distribute the solid fuel slurry and eject solid fuel droplets into the combustion chamber 122, particularly towards the liner 130 of the combustor 100. It should be understood that the line pressure of the solid fuel inlet port 158, as well as the oxygen inlet port 182 and the supercritical carbon dioxide ($sCO_2$) must exceed the operating pressure of the supercritical carbon dioxide ($sCO_2$) and the combustion forces (pressures) arising in the combustion chamber 122.

As shown by FIG. 3, the slurry line pressure (in a range of 150 psi), the trajectory angle $\theta$ and the rotation speed to the rotating disk 164 may all be optimized such that the injected slurry 150 preferably ignite in a conical shaped combustion zone 190 which is remote the rotating disk 164 as well as the porous thermal liner 130 as not to overheat either component.

In the case of droplets of a coal/water solid fuel slurry, the liquid water contained in the droplets evaporates as the droplets exit the rotating disk 164 and fall within the combustion chamber 122, leaving the coal particles to free fall in the supercritical carbon-dioxide (sCO$_2$) environment within the chamber 122. In the case of droplets of a coal/carbon dioxide (gas) slurry, vaporization of the carrier fluid is not required.

As the coal particles fall within the combustion chamber, the particles auto ignite, preferably in the combustion zone 190, when the oxygen 180 and coal particles meet in a flammable concentration at a temperature above the auto-ignition point.

Figure 4A:
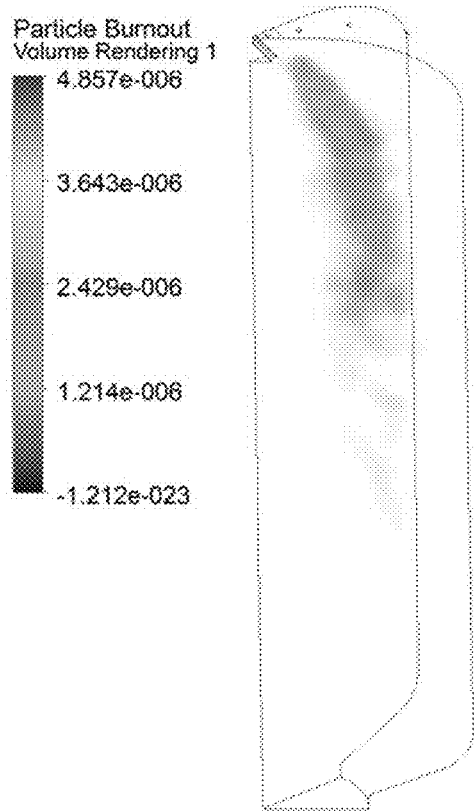
FIG. 4A is a volume rendering of solid fuel particle burnout in the oxy-combustor in pounds mass/second [lbm/s].
Figure 4B:
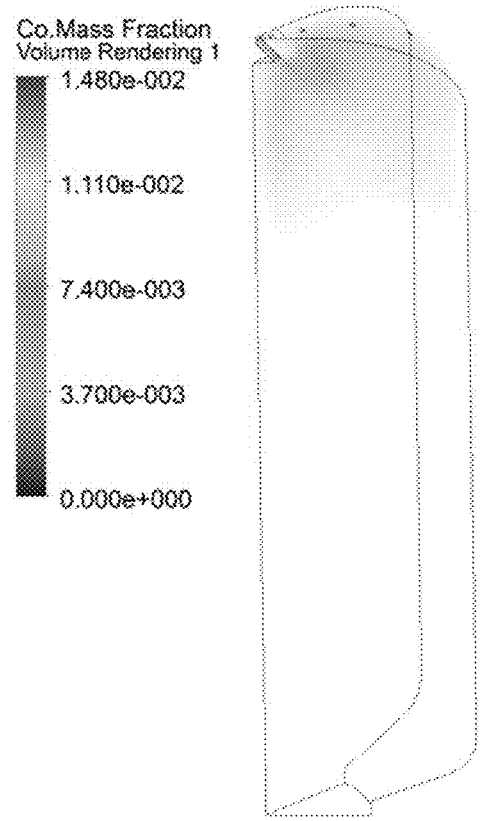
FIG. 4B is volume rendering of carbon dioxide mass fraction in the oxy-combustor.

By virtue of the solid fuel slurry 150 and the oxygen 180 being injected into the combustion chamber 122 at substantially the same trajectory angle, the location of the combustion zone 190 within the combustion vessel 102 may be determined by the intersection of the solid fuel slurry 150 and the oxygen, which is illustrated by the char burnout images of FIG. 4A and FIG. 4B. As seen, FIG. 4A (which is a volume rendering of solid fuel particle burnout in the oxy-combustor) highlights the anticipated combustion zone. As the volatile compounds vaporize and combust, the particle size decreases continuously. FIG. 4B is a volume rendering of carbon dioxide mass fraction in the oxy-combustor. This location can be optimized based on the location and orientation of the respective component injections, and is influenced by the flow pattern of the supercritical carbon-dioxide (sCO$_2$) environment within the chamber 122.

Figure 5:
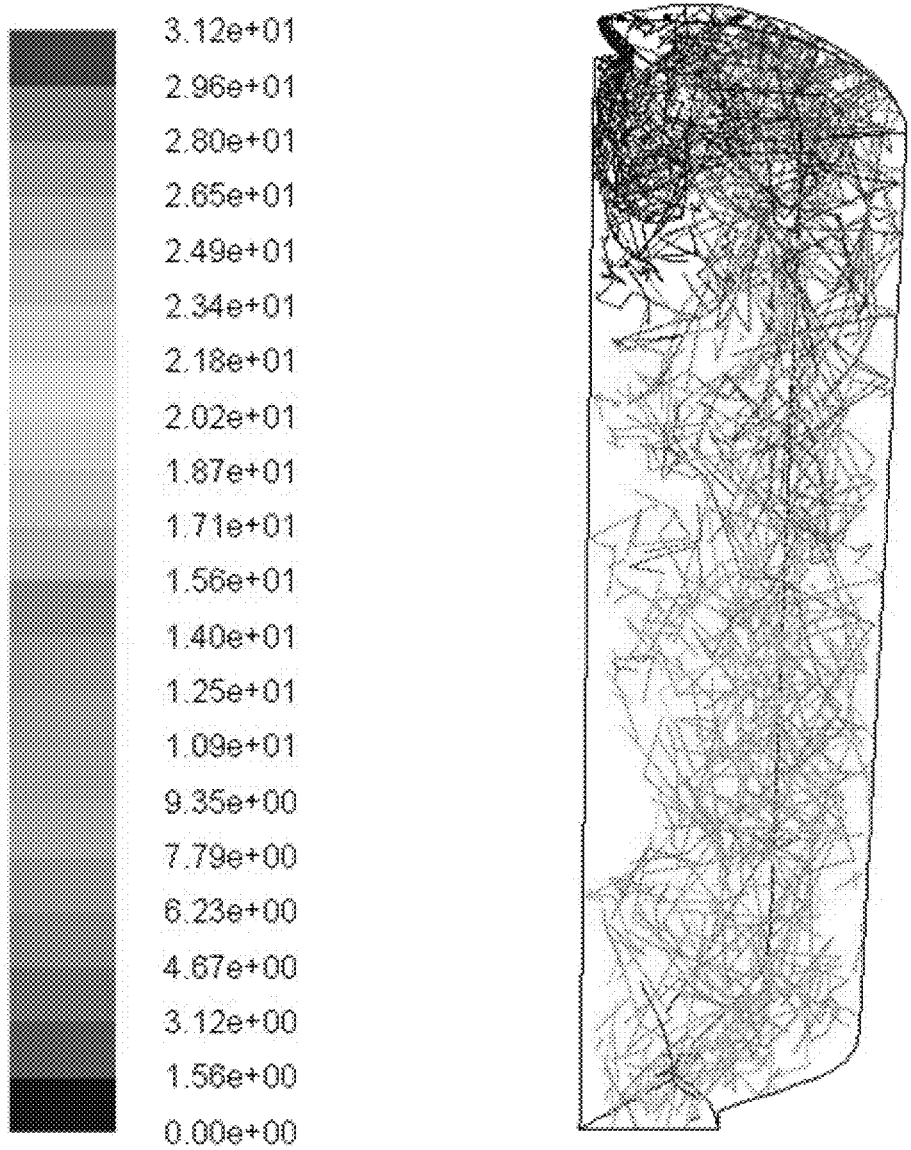
FIG. 5 is a particle trace rendering within the oxy-combustor using a 100 μm diameter sized droplets where the color indicates particle residence time in seconds.

As shown by FIG. 5, which illustrates the particle trace within the oxy-combustor using 100 μm diameter sized droplets (right hand side) and the residence time for the indicated shading (left hand side), it can be seen that the residence time of the particles of coal are shortest proximate the top of the combustor chamber 122. Accordingly, the residence time of the solid fuel in the oxy-combustor 100 can be optimized through selection of the geometry of the oxy-combustor 100, or through optimization of the flow path through the oxy-combustor 100. Additional swirl can be used to increase residence time without increasing the overall dimensions of the oxy-combustor 100, but must also include measures to minimize impingement of the solid fuel onto the thermal liner and keep a minimum separation between the combustion zone 190 and the thermal liner 130.

As the density of the supercritical carbon dioxide (sCO$_2$) is greater than that of ordinary gaseous flue gas, the supercritical carbon dioxide (sCO$_2$) in the combustion chamber 122, once heated with the heat of combustion from the solid fuel slurry 150 and oxygen 180, flows downward out the exhaust opening 196 of combustion vessel 102. The supercritical carbon dioxide (sCO$_2$), heated to a temperature of in a range of 625-675° C. may then enter cyclone separator to separate particular (e.g. ash) from the supercritical carbon dioxide (sCO$_2$) being used to heat the supercritical carbon dioxide (sCO$_2$) of the power generating block.

Thus in the foregoing manner, the recirculated supercritical carbon dioxide (sCO$_2$) acts as a diluent fluid to control temperature and component mixing within the combustion chamber 122, and as a thermal transfer fluid to transport thermal energy from the combustor 100 to a power generation block.

As set forth above, the supercritical carbon dioxide (sCO$_2$) combustor 100 is particularly configured and arranged to operate at pressures above the critical point of carbon dioxide, i.e. 72.9 atm or 1,071 psi. Thus, the combustion vessel 102 should be operable at an operating pressure of at least 1,100 psi. However, the actual operating pressures depend on the associated thermal loop, and should be high enough to account for pressure losses in the system while maintaining a supercritical state of the carbon dioxide dominated flue gas, or maintain a supercritical state through critical components for a trans-critical combustion loop which mixes supercritical and subcritical conditions. The actual critical point of the gas mixture will depend on the specific gas composition including products of combustion and other impurities.

The supercritical carbon dioxide (sCO$_2$) oxy-combustor 10, when coupled with a system of carbon dioxide capture, takes advantage of the foregoing properties of the supercritical carbon dioxide (sCO$_2$) to minimize the energy penalty associated with compressing captured carbon dioxide up to pipeline pressures for sequestration or enhanced oil recovery. Because of supercritical carbon dioxide's high density and moderate compressibility, it takes less energy to pump carbon dioxide in a supercritical state than to compress carbon dioxide when it is in a gaseous form.

In light of the foregoing, in addition to providing the foregoing structure, the present disclosure provides a method of operating an oxy-combustor comprising introducing supercritical carbon dioxide (sCO$_2$) into the supercritical fluid infusion chamber 140 from the at least one supercritical fluid inlet port 136; introducing the supercritical carbon dioxide (sCO$_2$) from the supercritical carbon dioxide (sCO$_2$) infusion chamber 140 to the combustion chamber 122 by passing the supercritical carbon dioxide (sCO$_2$) through the porous liner 130 and creating a supercritical fluid environment in the combustion chamber 122; introducing a solid fuel slurry 150 into the combustion chamber 122 from the at least one solid fuel slurry inlet port 158; introducing oxygen 180 into the combustion chamber 122 from the at least one oxygen inlet port 182; and burning the solid fuel of the solid fuel slurry 150 in the combustion chamber 122 such that heat generated from the burning of the solid fuel heats the supercritical carbon dioxide (sCO$_2$).

The method may further include mixing the solid fuel slurry 150 with a mixing apparatus 152 having a dispensing head 160, wherein the dispensing head 160 is connected to a shaft 152 located in the at least one solid fuel slurry inlet port 158, and the dispensing head 160 is located adjacent a distal end 156 of the at least one solid fuel slurry inlet port 158.

Mixing the solid fuel slurry 150 with a mixing apparatus 152 having a dispensing head 160 may further include applying the solid fuel slurry 150 to a solid fuel slurry trajectory surface 170 of the dispensing head 160, rotating the dispensing head 160 while the solid fuel slurry 150 flows downward along the trajectory surface 170 and forming droplets of the solid fuel slurry 150 as the solid fuel slurry 150 separates from a perimeter edge 172 of the dispensing head 160

The method may further include directing the solid fuel slurry 150 into the combustion chamber 122 at a trajectory angle θ relative to a longitudinal axis LA of the combustion vessel 102, directing the oxygen 180 into the combustion chamber 122 at a trajectory angle θ relative to the longitudinal axis LA of the combustion vessel 122; and wherein the trajectory angle θ of the oxygen and the trajectory angle θ of the solid fuel slurry are within 10 degrees of one another.

The method may further include directing the solid fuel slurry 150 into the combustion chamber 122 at a trajectory angle θ relative to a longitudinal axis LA of the combustion vessel 102, directing the oxygen 180 into the combustion chamber 122 at a trajectory angle θ relative to the longitudinal axis LA of the combustion vessel 122; and wherein the trajectory angle θ of the oxygen and the trajectory angle θ of the solid fuel slurry are intersect within the combustion chamber 122.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. An oxy-combustor, comprising:
a combustion vessel including at least one solid fuel slurry inlet port, at least one oxygen inlet port and at least one supercritical fluid inlet port;
wherein the combustion vessel is operable at an operating pressure of at least 1,100 psi;
wherein an interior of the combustion vessel comprises a combustion chamber and a supercritical fluid infusion chamber at least partially surrounding the combustion chamber;
wherein the supercritical fluid infusion chamber and the combustion chamber are separated by a porous liner surrounding the combustion chamber; and
wherein the supercritical fluid infusion chamber is located between the porous liner and an outer casing of the combustion vessel.

2. The oxy-combustor of claim 1 wherein:
the supercritical fluid infusion chamber is in fluid communication with at least one supercritical fluid inlet port containing a supercritical fluid; and
the supercritical fluid inlet port receives the supercritical fluid from a supercritical fluid recirculation loop which recycles the supercritical fluid from flue gas.

3. The oxy-combustor of claim 1 wherein:
the porous liner comprises a plurality openings arranged to introduce the supercritical fluid from the supercritical fluid infusion chamber to the combustion chamber; and
the plurality of openings have a size in a range of 0.001 inches to 0.25 inches.

4. The oxy-combustor of claim 1 wherein:
the at least one solid fuel slurry inlet port is arranged at an upper end of the combustion vessel such that a solid fuel slurry introduced into the combustion chamber from the at least one solid fuel slurry inlet port flows downward under gravity along a longitudinal length of the combustion chamber towards a lower end of the combustion vessel.

5. The oxy-combustor of claim 1 further comprising:
a mixing apparatus having a dispensing head; and
the dispensing head movable towards the at least one solid fuel slurry inlet port to close the at least one solid fuel slurry inlet port, and movable away from the at least one solid fuel slurry inlet port to open the at least one solid fuel slurry inlet port.

6. The oxy-combustor of claim 5 wherein:
the dispensing head is connected to a shaft located in the at least one solid fuel slurry inlet port; and
the shaft is extendable out of the at least one solid fuel slurry inlet port to move the dispensing head away from the at least one solid fuel slurry inlet port to open the at least one solid fuel slurry inlet port, and the shaft is retractable into the at least one solid fuel slurry inlet port to move the dispensing head towards the at least one solid fuel slurry inlet port to close the at least one solid fuel slurry inlet port.

7. The oxy-combustor of claim 6 wherein:
the dispensing head comprises a rotating disk.

8. The oxy-combustor of claim 6 wherein:
the dispensing head is movable towards the at least one solid fuel slurry inlet port to close the at least one solid fuel slurry inlet port, and is movable away from the at least one solid fuel slurry inlet port to open the at least one solid fuel slurry inlet port.

9. The oxy-combustor of claim 8 wherein:
the shaft is extendable out of the at least one solid fuel slurry inlet port to move the dispensing head away from the at least one solid fuel slurry inlet port to open the at least one solid fuel slurry inlet port, and the shaft is retractable into the at least one solid fuel slurry inlet port to move the dispensing head towards the at least one solid fuel slurry inlet port to close the at least one solid fuel slurry inlet port.

10. The oxy-combustor of claim 1 further comprising:
a mixing apparatus having a dispensing head;
wherein the dispensing head is connected to a shaft located in the at least one solid fuel slurry inlet port; and
wherein the dispensing head is located adjacent a distal end of the at least one solid fuel slurry inlet port.

11. The oxy-combustor of claim 10 wherein:
the dispensing head comprises a solid fuel slurry trajectory surface formed at a trajectory angle relative to a longitudinal axis of the combustion vessel; and
the trajectory angle is from 20 degrees to 70 degrees.

12. The oxy-combustor of claim 11 wherein:
the trajectory angle is from 30 degrees to 60 degrees.

13. The oxy-combustor of claim 10 wherein:
the mixing apparatus is arranged to introduce the solid fuel slurry into the combustion chamber at a trajectory angle relative to a longitudinal axis of the combustion vessel;
the at least one oxygen inlet port is arranged to introduce oxygen into the combustion chamber at a trajectory angle relative to the longitudinal axis of the combustion vessel; and
the trajectory angle of the oxygen from the at least one oxygen inlet port and the trajectory angle of the solid fuel slurry from the mixing apparatus are within 10 degrees of one another.

14. The oxy-combustor of claim 10 wherein:
the dispensing head is arranged to introduce the solid fuel slurry into the combustion chamber at a trajectory angle relative to a longitudinal axis of the combustion vessel;
the at least one oxygen inlet port is arranged to introduce oxygen into the combustion chamber at a trajectory angle relative to the longitudinal axis of the combustion vessel; and
the trajectory angle of the oxygen from the at least one oxygen inlet port and the trajectory angle of the solid fuel slurry from the dispensing head intersect within the combustion chamber.

15. The oxy-combustor of claim 1 wherein the supercritical fluid infusion chamber completely surrounds the combustion chamber.

16. A method of operating an oxy-combustor, comprising:
providing an oxy-combustor comprising a combustion vessel including at least one solid fuel slurry inlet port, at least one oxygen inlet port and at least one supercritical fluid inlet port;
  wherein the combustion vessel is operable at an operating pressure of at least 1,100 psi;
  wherein an interior of the combustion vessel comprises a combustion chamber and a supercritical fluid infusion chamber at least partially surrounding the combustion chamber;
  wherein the supercritical fluid infusion chamber and the combustion chamber are separated by a porous liner surrounding the combustion chamber; and
  wherein the supercritical infusion chamber is located between the porous liner and an outer casing of the combustion vessel;
introducing a supercritical fluid into the supercritical fluid infusion chamber from the at least one supercritical fluid inlet port;
introducing the supercritical fluid from the supercritical fluid infusion chamber to the combustion chamber by passing the supercritical fluid through the porous liner and creating a supercritical fluid environment in the combustion chamber;
introducing a solid fuel slurry into the combustion chamber from the at least one solid fuel slurry inlet port;
introducing oxygen into the combustion chamber from the at least one oxygen inlet port; and
burning the solid fuel in the combustion chamber such that heat generated from the burning of the solid fuel heats the supercritical fluid.

17. The method of claim 16 further comprising:
mixing the solid fuel slurry with a mixing apparatus having a dispensing head, wherein the dispensing head is connected to a shaft located in the at least one solid fuel slurry inlet port, and the dispensing head is located adjacent a distal end of the at least one solid fuel slurry inlet port.

18. The method of claim 17 wherein:
mixing the solid fuel slurry with a mixing apparatus having a dispensing head includes applying the solid fuel slurry to a solid fuel slurry trajectory surface of the dispensing head, rotating the dispensing head while the solid fuel slurry flows downward along the trajectory surface and forming droplets of the solid fuel slurry as the solid fuel slurry separates from a perimeter edge of the dispensing head.

19. The method of claim 16 wherein:
the at least one solid fuel slurry inlet port is arranged at an upper end of the combustion vessel such that a solid fuel slurry introduced into the combustion chamber from the at least one solid fuel slurry inlet port flows downward under gravity along a longitudinal length of the combustion chamber towards a lower end of the combustion vessel.

20. The method of claim 16 further comprising:
directing the solid fuel slurry into the combustion chamber at a trajectory angle relative to a longitudinal axis of the combustion vessel;
directing the oxygen into the combustion chamber at a trajectory angle relative to the longitudinal axis of the combustion vessel; and
wherein the trajectory angle $\theta$ of the oxygen and the trajectory angle $\theta$ of the solid fuel slurry are within 10 degrees of one another.

21. The method of claim 16 further comprising:
directing the solid fuel slurry in the combustion chamber at a trajectory angle relative to a longitudinal axis of the combustion vessel;
directing the oxygen into the combustion chamber at a trajectory angle relative to the longitudinal axis of the combustion vessel; and
wherein the trajectory angle of the oxygen and the trajectory angle of the solid fuel slurry intersect within the combustion chamber.

* * * * *